US009140562B2

(12) United States Patent
Mignen et al.

(10) Patent No.: US 9,140,562 B2
(45) Date of Patent: Sep. 22, 2015

(54) SYSTEM AND METHOD FOR TRANSFERRING VEHICLE OPERATING DATA TO AN EXTERNAL NAVIGATION SYSTEM

(76) Inventors: Claude Mignen, Vaureal (FR); Douglas C. Campbell, Northville, MI (US); Todd Sanders, Zeeland, MI (US); Mark Michmerhuizen, Holland, MI (US)

(*) Notice: Subject to any disclaimer, the term of this patent is extended or adjusted under 35 U.S.C. 154(b) by 0 days.

(21) Appl. No.: 13/071,254

(22) Filed: Mar. 24, 2011

(65) Prior Publication Data

US 2011/0313656 A1 Dec. 22, 2011

(51) Int. Cl.
*G01C 21/26* (2006.01)
*G01C 21/10* (2006.01)
*G01S 19/49* (2010.01)

(52) U.S. Cl.
CPC ............... *G01C 21/26* (2013.01); *G01C 21/10* (2013.01); *G01S 19/49* (2013.01)

(58) Field of Classification Search
CPC .................. G01C 21/26; G08G 1/096811
USPC ................. 701/119, 207, 414, 420, 517
IPC .................. G01C 21/12; G01S 19/45, 19/48
See application file for complete search history.

(56) References Cited

U.S. PATENT DOCUMENTS

| 6,230,100 | B1 | 5/2001 | Geier | |
|---|---|---|---|---|
| 6,563,418 | B1* | 5/2003 | Moon | 370/475 |
| 6,850,844 | B1* | 2/2005 | Walters et al. | 701/410 |
| 7,630,834 | B2* | 12/2009 | Klausner et al. | 701/472 |
| 7,706,967 | B2* | 4/2010 | Knockeart et al. | 701/119 |
| 7,742,873 | B2* | 6/2010 | Agnew et al. | 701/423 |
| 7,821,421 | B2* | 10/2010 | Tamir et al. | 340/901 |
| 8,417,450 | B2* | 4/2013 | Figueroa | 701/412 |
| 2002/0049538 | A1* | 4/2002 | Knapton et al. | 701/216 |
| 2005/0197747 | A1* | 9/2005 | Rappaport et al. | 701/1 |
| 2008/0133084 | A1* | 6/2008 | Weinmann et al. | 701/36 |
| 2009/0005070 | A1* | 1/2009 | Forstall et al. | 455/456.1 |
| 2009/0016216 | A1* | 1/2009 | Ballard et al. | 370/230 |
| 2009/0171528 | A1* | 7/2009 | Golde et al. | 701/35 |
| 2011/0224901 | A1* | 9/2011 | Aben et al. | 701/208 |

FOREIGN PATENT DOCUMENTS

| CN | 101493335 A | 7/2009 |
|---|---|---|
| CN | 101517362 A | 8/2009 |
| CN | 101545788 A | 9/2009 |
| CN | 101563583 A | 10/2009 |
| CN | 201331348 Y | 10/2009 |

(Continued)

OTHER PUBLICATIONS

PCT Invitation to Pay Additional Fees Including International Search Report mailed Jun. 27, 2012.

(Continued)

*Primary Examiner* — John R Olszewski
*Assistant Examiner* — Todd Melton
(74) *Attorney, Agent, or Firm* — Fletcher Yoder, P.C.

(57) ABSTRACT

A vehicle information system is provided that includes an interface module configured to receive operating data from a vehicle information system. The interface module is also configured to transfer the operating data to a navigation system that is not built-in to the vehicle to facilitate vehicle position determination without using external positioning signals received or processed by the vehicle.

20 Claims, 4 Drawing Sheets

(56) References Cited

FOREIGN PATENT DOCUMENTS

| CN | 101785039 A | 7/2010 |
|---|---|---|
| DE | 102010024355 | 6/2010 |
| DE | 19916529 | 1/2011 |
| EP | 1139317 A | 10/2001 |
| EP | 2219044 A1 | 8/2010 |
| JP | 2008232771 A | 10/2008 |
| JP | 2009121879 | 6/2009 |
| JP | 2010101745 | 5/2010 |
| WO | 2004-034352 | 4/2004 |
| WO | 2008037471 | 4/2008 |
| WO | 2008037472 | 4/2008 |
| WO | WO 2010040404 A1 * | 4/2010 ............. G01C 21/32 |

OTHER PUBLICATIONS

PCT Notification of Transmittal of the International Search Report and the Written Opinion of the International Searching Authority, or the Declaration mailed Feb. 20, 2013.

International Preliminary Report on Patentability for PCT No. PCT/US2012/030351 dated Oct. 3, 2013; 15 pgs.

Japanese Office Action mailed Sep. 24, 2014.

CN Office Action Mailed Jun. 30, 2015.

* cited by examiner

SYSTEM AND METHOD FOR TRANSFERRING VEHICLE OPERATING DATA TO AN EXTERNAL NAVIGATION SYSTEM

BACKGROUND

The invention relates generally to a system and method for transferring vehicle operating data to an external navigation system.

Certain vehicles include a spatial locating system (e.g., global positioning system (GPS)) configured to determine the position of the vehicle based on external positioning signals (e.g., signals from GPS satellites). The vehicle position may be presented to a driver and/or passenger via a graphical display located within the vehicle interior. In addition, the vehicle position may be broadcast via a vehicle communication network to an off-board vehicle navigation system positioned remote from the vehicle. The off-board navigation system is configured to monitor the position of the vehicle, thereby enabling a remote operator to provide directions toward a destination, send emergency vehicles in the event of a collision and/or identify the position of a stolen vehicle, for example. Certain off-board navigation systems may be configured to transmit navigation information back to the vehicle such that a driver may view route information on the graphical display. Unfortunately, if the vehicle passes under a bridge, through a tunnel or by a tall building, the signal from the external positioning signals may be insufficient to determine vehicle position.

Other vehicles may include an on-board spatial locating device, such as a handheld/mountable GPS receiver, or a portable device (e.g., mobile phone, personal digital assistant, notebook computer, etc.) having an integrated spatial locating device. Similar to the spatial locating system described above, the on-board spatial locating device is configured to receive external positioning signals (e.g., via an internal antenna, an antenna mounted to the roof of the vehicle, etc.), and to determine vehicle position based on the signals. Unfortunately, if the external positioning signals are at least partially blocked, the signal received by the on-board spatial locating device may be insufficient to determine vehicle position.

BRIEF DESCRIPTION OF THE INVENTION

The present invention relates to a vehicle communication network including an interface module configured to receive operating data from a vehicle information system. The interface module is also configured to transfer the operating data to a navigation system that is not built-in to the vehicle to facilitate vehicle position determination without using external positioning signals received or processed by the vehicle.

The present invention also relates to a vehicle communication network including a vehicle information system configured to output operating data. The vehicle communication network also includes a navigation system that is not built-in to the vehicle. The navigation system is configured to determine vehicle position based on external positioning signals when available. The vehicle communication network further includes an interface module configured to receive the operating data from the vehicle information system, and to output the operating data to the navigation system to facilitate vehicle position determination without using the external positioning signals received or processed by the vehicle when the external positioning signals are not available or are unreliable.

The present invention further relates to a method for operating a vehicle communication network including transferring operating data from a vehicle information system to a navigation system that is not built-in to the vehicle. The method also includes determining vehicle position via the navigation system based upon the operating data without using external positioning signals received or processed by the vehicle.

DRAWINGS

DETAILED DESCRIPTION

Figure 1:
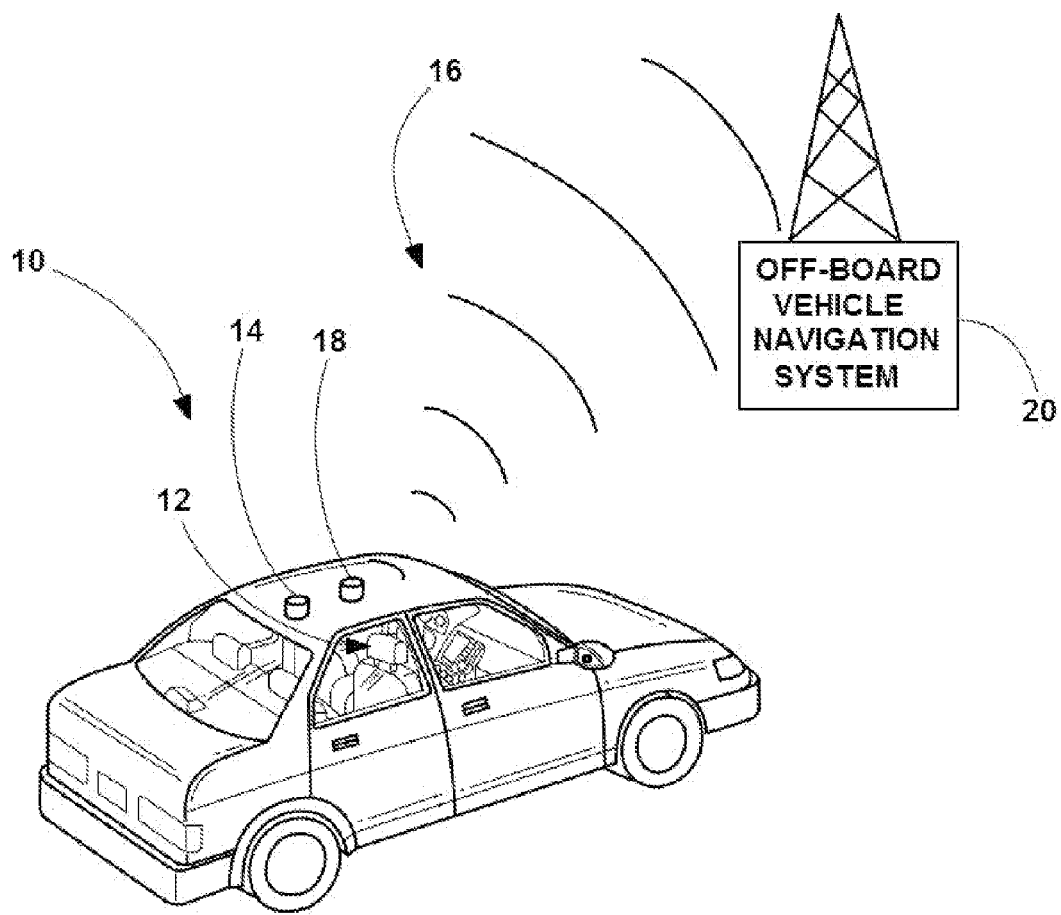
FIG. 1 is a perspective view of an exemplary vehicle having an embodiment of a vehicle communication network configured to transfer operating data from a vehicle information system to an off-board vehicle navigation system.

FIG. 1 is a perspective view of an exemplary vehicle 10 having an embodiment of a vehicle communication network configured to transfer operating data from a vehicle information system to an off-board vehicle navigation system. As illustrated, the vehicle 10 includes an interior 12 having a variety of graphical displays and gauges that may be driven by a vehicle information system. The vehicle information system is configured to monitor operating data (e.g., vehicle speed, compass heading, distance traveled, etc.), and to output the operating data to the displays and gauges within the vehicle interior 12. For example, the vehicle information system may include a speed sensor configured to monitor vehicle speed, and to output a signal indicative of the speed to a speedometer within the vehicle interior 12. In addition, the vehicle information system may include an electronic compass configured to monitor vehicle heading, and to output a signal indicative of the heading to an electronic display within the vehicle interior 12. As discussed in detail below, the vehicle information system may also include a transmission sensor, an antilock braking system, a stability control system and/or an electric motor controller.

In the illustrated embodiment, the vehicle 10 includes a spatial locating system (e.g., global positioning system (GPS)) configured to determine the position of the vehicle based on external positioning signals (e.g., signals from GPS satellites). As illustrated, the spatial locating system includes an antenna 14 mounted on the roof of the vehicle 10, and configured to receive the external positioning signals. In certain embodiments, the vehicle 10 includes an on-board controller configured to determine vehicle position based on the external positioning signals. The vehicle position may be presented to a driver and/or passenger via a graphical display located within the vehicle interior 12. In addition, the vehicle position may be broadcast to a remote receiver via a vehicle communication network 16.

In the illustrated embodiment, the vehicle communication network 16 includes an antenna 18 mounted to the roof of the vehicle 10, and an off-board vehicle navigation system 20 positioned remote from the vehicle. The antenna 18 is configured to transmit signals indicative of vehicle position to the off-board vehicle navigation system 20, thereby enabling the navigation system 20 to monitor and/or track the position of the vehicle. For example, the off-board vehicle navigation system 20 may enable a remote operator to provide directions toward a destination, send emergency vehicles in the event of a collision and/or identify the position of a stolen vehicle. In certain embodiments, the antenna 18 may also be configured to receive signals indicative of route and/or destination information from the off-board navigation system 20. In such embodiments, the route and/or destination information may be presented to the driver, along with the vehicle position, on the graphical display. As will be appreciated, the wireless communication link between the vehicle 10 and the navigation system 20 may utilize any suitable communication protocol, such as cellular signals (e.g., EVDO, GPRS, HSPA, etc.), WiFi, or Bluetooth, among others.

Unfortunately, if the vehicle 10 passes under a bridge, through a tunnel or by a tall building, the signals from the external positioning devices (e.g., GPS satellites) received by the antenna 14 may be insufficient to determine vehicle position. Consequently, the vehicle communication network 16 is also configured to transfer operating data from the vehicle information system to the off-board vehicle navigation system 20 to facilitate vehicle position determination without using the external positioning signals. For example, the operating data may include vehicle speed and compass heading, thereby enabling a vehicle controller and/or the off-board vehicle navigation system 20 to compute vehicle position via dead reckoning. In certain embodiments, the off-board vehicle navigation system 20 will store the last position received by the spatial locating system. The navigation system 20 will then update the vehicle position based on the instantaneous compass heading and vehicle speed. Once the signals from the external positioning devices becomes sufficient to compute vehicle position via the spatial locating system, the off-board vehicle navigation system 20 will update the dead reckoning position with the position as determined by the spatial locating system. In this manner, vehicle position may be continuously monitored, even when the signals from the external positioning devices are absent/unavailable or unreliable (e.g., intermittent, weak, etc.).

While vehicle speed and compass heading are described above, it should be appreciated that other operating parameters may be employed to determine vehicle position. For example, in certain embodiments, distance traveled, steering angle, yaw rate, acceleration, brake pedal position, antilock braking system activation, stability control system activation and/or regenerative braking activation may also be utilized to determine vehicle position when the gain of the external positioning signals is insufficient to determine vehicle position. In addition, as discussed in detail below, certain vehicle operating parameters may enable the off-board vehicle navigation system 20 to determine road conditions and/or traffic conditions. For example, in certain embodiments, the off-board vehicle navigation system 20 may be configured to determine the posted speed limit at the current vehicle location. In such embodiments, the navigation system 20 will identify a low ambient speed condition if the vehicle speed is substantially lower than the posted speed limit. The navigation system 20 may also identify slippery road conditions by identifying frequent activation of the antilock braking system and/or the stability control system. In such embodiments, the off-board vehicle navigation system 20 may inform other drivers in the area (e.g., via the communication network 16) of the low ambient speed and/or the slippery road conditions.

Figure 2:
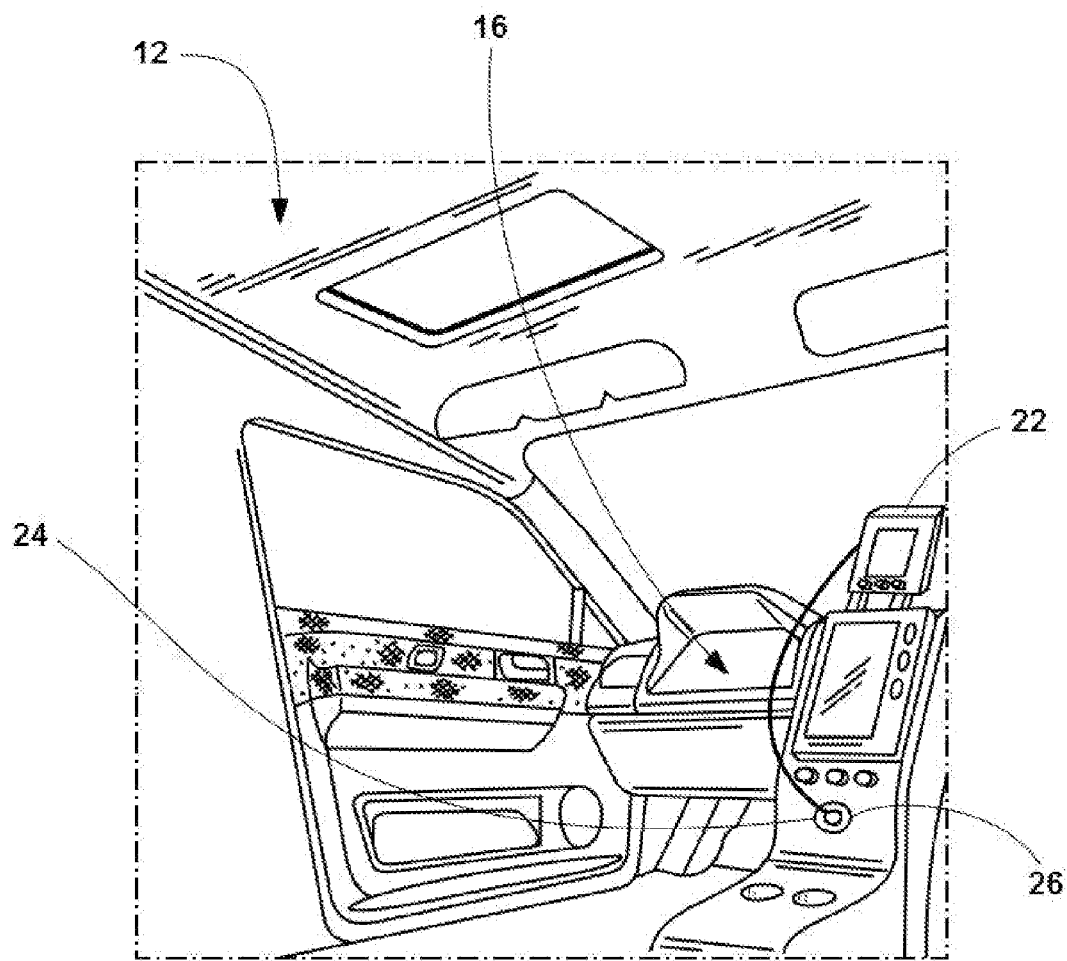
FIG. 2 is a perspective view of a part of the interior of the vehicle of FIG. 1, including an embodiment of a vehicle communication network configured to transfer operating data from a vehicle information system to an on-board spatial locating device.

FIG. 2 is a perspective view of a part of the interior 12 of the vehicle 10 of FIG. 1, including an embodiment of a vehicle communication network 16 configured to transfer operating data from a vehicle information system to an on-board spatial locating device 22. In the illustrated embodiment, the on-board spatial locating device 22 is a GPS receiver mounted to the center console of the vehicle interior 12. However, it should be appreciated that an on-board spatial locating device 22 may be integrated within a portable device (e.g., mobile phone, personal digital assistant, notebook computer, etc.), and the vehicle information system may interface with the portable device via the communication network 16. In the illustrated embodiment, the on-board spatial locating device 22 is configured to receive external positioning signals (e.g., via an internal antenna, an antenna mounted on the roof of the vehicle 10, etc.), and to determine vehicle position based on the signals. Unfortunately, if the vehicle 10 passes under a bridge, through a tunnel or by a tall building, the gain of the external positioning signals received by the on-board spatial locating device 22 may be insufficient to determine vehicle position. Consequently, in the illustrated embodiment, the communication network 16 will provide the on-board spatial locating device 22 with operating data to facilitate vehicle position determination without using the external positioning signals.

As illustrated, the spatial locating device 22 includes a connector 24 configured to interface with an electrical outlet 26, such as the illustrated cigarette lighter receptacle. As will be appreciated, the electrical outlet 26 will supply electrical power to the spatial locating device 22 via the connector 24. In the illustrated embodiment, the connector 24 is also configured to transfer operating data from the vehicle information system to the spatial locating device 22. While a cigarette lighter receptacle is employed in the illustrated embodiment, it should be appreciated that other electrical outlets may be utilized in alternative embodiments. For example, in certain embodiments, the spatial locating device may be configured to interface with a standard 5-volt, 12-volt, 42-volt or 48-volt electrical outlet, or a proprietary electrical outlet.

As discussed in detail below, the vehicle communication network 16 includes an interface module configured to modulate the direct current power signal supplied to the spatial locating device 22, thereby facilitating signal transmission from the vehicle information system to the on-board spatial locating device 22. Such an embodiment may reduce the number of wires within the vehicle interior 12, thereby enhancing the appearance of the interior 12. In alternative embodiments, the communication network 16 may employ a universal serial bus interface, a Bluetooth interface or a WiFi interface to transfer operating data from the vehicle information system to the spatial locating device 22. Similar to the off-board vehicle navigation system 20 described above with reference to FIG. 1, the spatial locating device 22 may utilize dead reckoning to determine vehicle position based on operating data (e.g., vehicle speed, compass heading, etc.) when the gain of the external positioning signals is insufficient to determine vehicle position.

Figure 3:
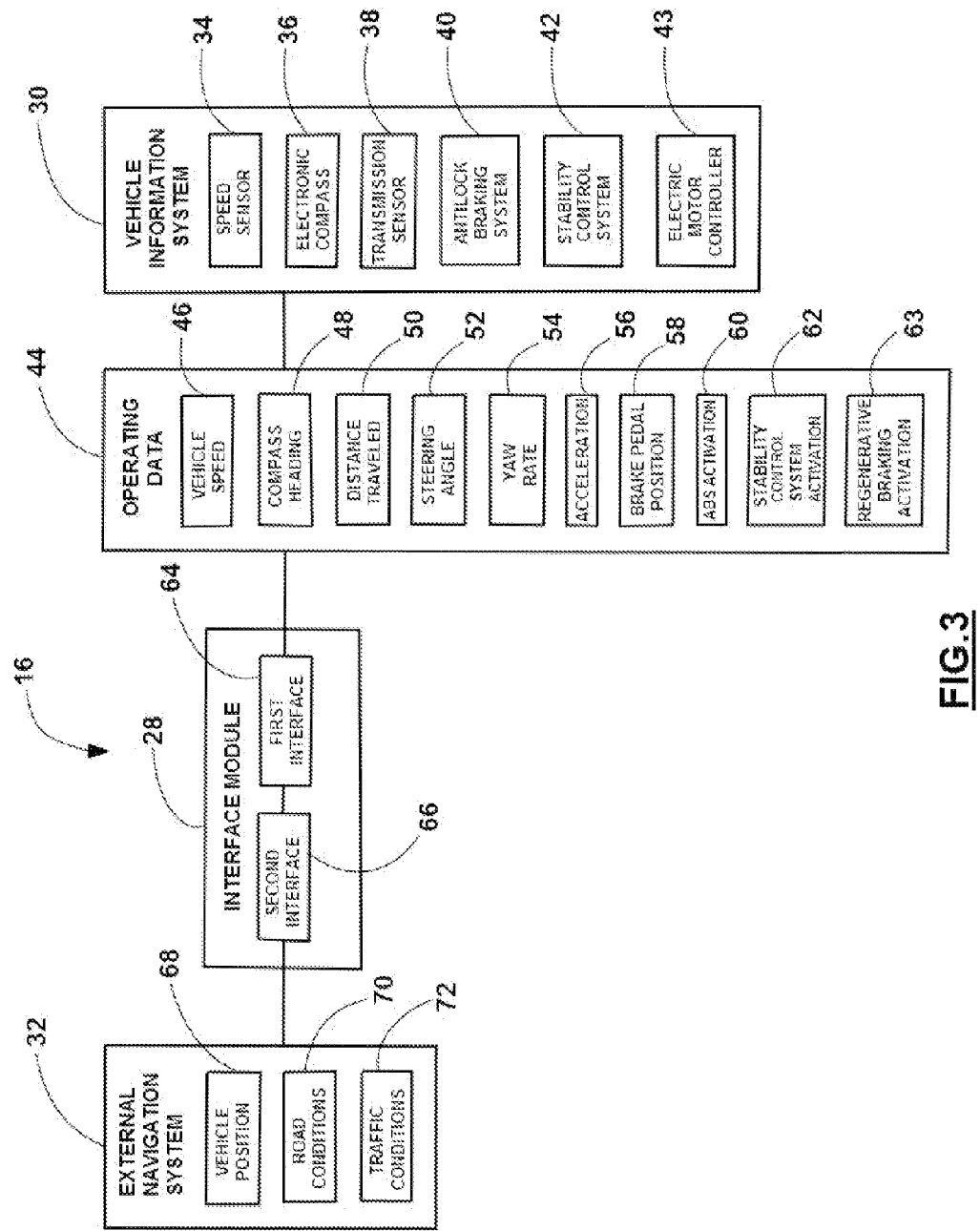
FIG. 3 is a block diagram of an embodiment of a vehicle communication network having an interface module configured to transfer operating data from a vehicle information system to an external navigation system.

FIG. 3 is a block diagram of an embodiment of a vehicle communication network 16 having an interface module 28 configured to transfer operating data from a vehicle information system 30 to an external navigation system 32. The external navigation system 32 is not built-in to the vehicle 10 (i.e., external to the vehicle information system 30). For example, the external navigation system 32 may be an off-board vehicle navigation system 20, as described above with reference to FIG. 1, or an on-board spatial locating device 22, as described above with reference to FIG. 2. By providing the external navigation system 32 with operating data from the vehicle information system 30, the external navigation system may determine vehicle position without external positioning signals. For example, the external navigation system 32 may be able to provide an accurate vehicle position, even when the signals from the external positioning devices are absent or insufficient to determine vehicle position. While the illustrated embodiment includes an independent interface module 28, it should be appreciated that the interface module 28 may be integrated within the vehicle information system 30, or other vehicle system (e.g., infotainment system, etc.) in alternative embodiments.

In the illustrated embodiment, the vehicle information system 30 includes a speed sensor 34, an electronic compass 36, a transmission sensor 38, an antilock braking system (ABS) 40, a stability control system 42, and an electric motor controller 43. The speed sensor 34 may be configured to monitor wheel rotation or driveshaft rotation to determine vehicle speed. In addition, the electronic compass 36 may include multiple solid state magnetic field sensors configured to determine vehicle heading by detection of the Earth's magnetic field. When used, such signals may be corrected in a conventional manner based upon the local magnetic deviation, influences of the vehicle structures, and so forth. The transmission sensor 38 may monitor various parameters of the vehicle transmission, such as the selected gear, internal rotation rates and/or driveshaft rotation.

As will be appreciated, the antilock braking system 40 is configured to substantially reduce or eliminate the possibility of locking the vehicle wheels during a braking maneuver. Consequently, the antilock braking system 40 may include wheel rotation sensors, accelerometers, yaw sensors, brake pedal position sensors, steering angle sensors and/or other sensors configured to facilitate operation of the antilock braking system 40. Similarly, the stability control system 42 may include wheel rotation sensors, accelerometers, yaw sensors, steering angle sensors and/or other sensors configured to provide the stability control system with sufficient information to enhance vehicle dynamics during abrupt maneuvers. For example, the stability control system may include a traction control system configured to substantially reduce wheel spin during acceleration and/or steering maneuvers, and/or a rollover control system configured to substantially reduce the possibility of vehicle rollover during steering and/or braking maneuvers. In addition, electric and/or hybrid-electric vehicles include an electric motor controller 43 configured to regulate power to an electric drive motor. In certain embodiments, the motor controller 43 is configured to provide regenerative braking by converting rotational motion of the electric motor into electrical power, which may be used to charge a vehicle battery. In such embodiments, the electric motor controller 43 will include a sensor configured to detect regenerative braking activation (e.g., via brake pedal position and/or accelerator pedal position). The resultant signals from each of the sensors within the vehicle information system 30 are output to the external navigation system 32 to facilitate vehicle position determination without external positioning signals.

While the vehicle information system 30 includes a speed sensor 34, an electronic compass 36, a transmission sensor 38, an antilock braking system (ABS) 40, a stability control system 42, and an electric motor controller 43 in the illustrated embodiment, it should be appreciated that alternative embodiments may include more or fewer sensors/systems. For example, in certain embodiments, the vehicle information system 30 may not include an antilock braking system 40 or a stability control system 42. Alternative embodiments may include other sensors, such as a gyroscope configured to measure vehicle rotation, to provide additional information to the external navigation system 32. As will be appreciated, the accuracy of the vehicle position determination may be at least partially dependent on the number of sensors employed to monitor the vehicle state. Consequently, additional sensors may provide more accurate position determination when external positioning signals are unavailable.

As illustrated, the vehicle information system 30 is configured to output operating data 44 to the interface module 28. In the illustrated embodiment, the operating data 44 includes vehicle speed 46, compass heading 48, distance traveled 50, steering angle 52, yaw rate 54, acceleration 56, brake pedal position 58, antilock braking system (ABS) activation 60, stability control system activation 62, and regenerative braking activation 63. In certain embodiments, the vehicle speed 46 may be provided by the speed sensor 34, the transmission sensor 38 and/or the antilock braking system 40. The compass heading 48 may be provided by the electronic compass 36, and the distance traveled 50 may be computed based on output from the speed sensor 34, the transmission sensor 38 and/or the antilock braking system 40. The steering angle 52 and raw rate 54 may be provided by the stability control system 42, and the acceleration 56 and the brake pedal position 58 may be provided by the antilock braking system 40. Furthermore, the antilock braking system 40 will output ABS activation 60, the stability control system 42 will output stability control system activation 62, and the electric motor controller 43 will output regenerative braking activation 63.

While the operating data 44 includes vehicle speed 46, compass heading 48, distance traveled 50, steering angle 52, yaw rate 54, acceleration 56, brake pedal position 58, antilock braking system (ABS) activation 60, stability control system activation 62, and regenerative braking activation 63 in the illustrated embodiment, it should be appreciated that additional operating data may be provided in alternative embodiments. For example, if the vehicle information system 30 includes a gyroscope, the operating data 44 may include vehicle orientation, rotational velocity and/or rotational acceleration. In addition, if the vehicle information system does not include an antilock braking system or a stability control system, the steering angle, yaw rate, acceleration, brake pedal position, ABS activation and/or stability control system activation may be omitted from the operating data 44. Furthermore, if the vehicle is not an electric or hybrid-electric vehicle, the vehicle information system may not include an electric motor controller. Consequently, the operating data 44 may omit the regenerative braking activation data. As previously discussed, providing additional operating data to the external navigation system may enhance the accuracy of the vehicle position determination when external positioning signals are unavailable.

As illustrated, the interface module 28 includes a first interface 64 and a second interface 66. The first interface 64 is configured to receive the operating data 44 from the vehicle information system 30, and the second interface 66 is configured to output operating data to the external navigation system 32. In certain embodiments, the first interface 64 is a CAN Bus interface configured to communicate with the vehicle information system 30. However, it should be appreciated that any suitable interface may be employed in alternative embodiments. For example, the first interface 64 may employ a FlexRay interface, an Ethernet interface, or any other suitable propriety or standardized communication protocol to facilitate communication between the interface module 28 and the vehicle information system 30.

The second interface 66 may be particularly selected to communicate with the on-board spatial locating device 22 or the off-board vehicle navigation system 20. For example, the second interface 66 may employ a wireless connection to establish a communication link between the off-board vehicle navigation system 20 and the interface module 28. As previously discussed, the wireless connection may utilize any suitable communication protocol, such as cellular signals (e.g., EVDO, GPRS, HSPA, etc.), WiFi, or Bluetooth, among others. For example, in certain embodiments, operating data may be transmitted to the off-board navigation system 20 via text messages, e.g., using the short message service (SMS) protocol. As discussed in detail below, the wireless connection may be configured to transfer operating data from the vehicle information system 30 to the off-board vehicle navigation system 20, and to transfer road condition and/or traffic information from the navigation system 20 to the vehicle information system 30.

Furthermore, the second interface 66 may employ a wireless or wired connection to establish a communication link between the on-board spatial locating device 22 and the interface module 28. In certain embodiments, the second interface 66 may utilize a universal serial bus interface, a Bluetooth interface or a WiFi interface to transfer operating data from the vehicle information system 30 to the spatial locating device 22. However, it should be appreciated that a variety of other wireless protocols (e.g., DECT, wireless USB, etc.) or wired connections (e.g., Ethernet) may be employed in alternative embodiments. For example, the spatial locating device 22 may include a connector configured to interface with an electrical outlet (e.g., 12-volt cigarette lighter receptacle, 48-volt electrical connector, etc.). In certain embodiments, the electrical outlet will supply electrical power to the spatial locating device 22, and establish a communication link between the vehicle information system 30 and the spatial locating device 22. In such embodiments, the second interface 66 is configured to modulate the direct current power signal supplied to the spatial locating device 22, thereby facilitating signal transmission from the vehicle information system 30 to the spatial locating device 22. By providing both power and data signals through a single cable, the number of wires extending through the vehicle interior 12 will be reduced, thereby providing a more desirable interior appearance.

As previously discussed, the external navigation system 32 is configured to determine vehicle position, as represented by block 68, either via the external positioning signals or via the operating data 44 received from the interface module 28. Specifically, if the external positioning signals are unavailable, such as when the vehicle 10 passes under a bridge, through a tunnel or by a tall building, the external navigation system 32 will determine vehicle position by dead reckoning. First, the external navigation system will store the last position determined by the external positioning signals. The external navigation system will then update the position based on vehicle speed, compass heading, distance traveled, steering angle, yaw rate and/or acceleration. For example, in certain embodiments, the external navigation system 32 may update vehicle position at discrete time intervals. In such embodiments, the external navigation system will determine distance traveled by multiplying the vehicle speed by the time interval. The external navigation system will then update the vehicle position based on the distance traveled and the compass heading. The external navigation system may also adjust the distance traveled based on measured acceleration, and/or adjust the heading based on steering angle and/or measured yaw rate. In this manner, the external navigation system 32 may provide a substantially accurate vehicle position determination, even when the gain of the external positioning signals is insufficient to determine vehicle position.

In certain embodiments, the external navigation system 32 is configured to determine road conditions, as represented by block 70, and traffic conditions, as represented by block 72. For example, if the external navigation system 32 detects frequent activation of the antilock braking system and/or the stability control system, the external navigation system will identify a slippery road surface (e.g., due to rain, ice, snow, etc.). In certain embodiments, the external navigation system 32 will relay the road condition information to other drivers, thereby advising the drivers of the slippery conditions. For example, multiple vehicles may be linked to an off-board vehicle navigation system 20 via respective vehicle communication networks. In such an embodiment, each vehicle will report activation of the antilock braking system and/or the stability control system to the vehicle navigation system 20. If the vehicle navigation system 20 detects that multiple vehicles traveling along a particular road are repeatedly activating the antilock braking system and/or the stability control system, the vehicle navigation system 20 will identify the road as having a slippery surface. The vehicle navigation system 20 will then relay the road conditions to the vehicles via the respective communication networks. Consequently, each driver may choose an alternate route to avoid the slippery road, or exercise additional caution (e.g., reduce vehicle speed, increase following distance, etc.) while traveling along the slippery roadway.

The external navigation system 32 may also identify traffic conditions based on vehicle speed, brake pedal position and/or vehicle spacing. For example, if the external navigation system 32 detects frequent application of the vehicle brakes and/or low vehicle speed relative to the posted speed limit, the external navigation system will identify a high traffic density and/or a low ambient speed. In certain embodiments, the external navigation system 32 will relay the traffic condition information to other drivers, thereby advising the drivers of the slow moving traffic. For example, multiple vehicles may be linked to an off-board vehicle navigation system 20 via respective vehicle communication networks. In such an embodiment, each vehicle will report vehicle position, activation of the vehicle brakes and/or vehicle speed to the vehicle navigation system 20. If the vehicle navigation system 20 detects tight spacing between vehicles, the vehicle navigation system 20 will identify the road as having a high traffic density. In addition, if multiple vehicles traveling along a particular road are repeatedly activating the brakes and/or traveling at a speed substantially lower than the posted speed limit, the vehicle navigation system 20 will identify the road as having a low ambient speed. The vehicle navigation system 20 will then relay the traffic condition information to the vehicles via the respective communication networks. Consequently, each driver may select an alternate route to avoid the high traffic/low ambient speed road, or reduce vehicle speed in advance of the slow traffic area. In certain embodiments, the vehicle navigation system 20 may recommend an alternate route if a high traffic density, low ambient speed and/or slippery road conditions are detected.

Figure 4:
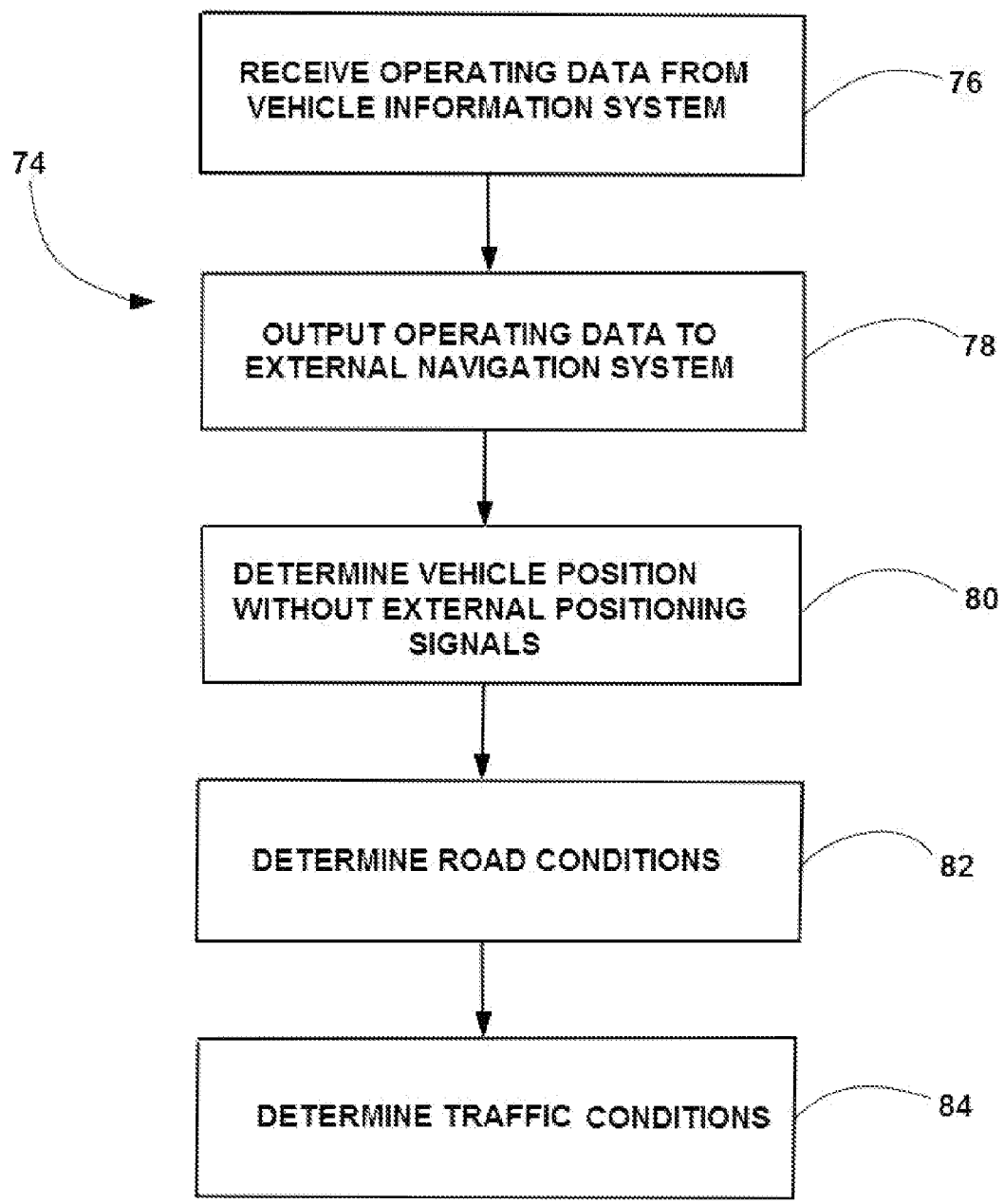
FIG. 4 is a flow diagram of an exemplary method for operating a vehicle communication network.

FIG. 4 is a flow diagram of an exemplary method 74 for operating a vehicle communication network. First, as represented by block 76, operating data is received from the vehicle information system. As previously discussed, the operating data may include vehicle speed, compass heading, distance traveled, steering angle, yaw rate, acceleration, brake pedal position, antilock braking system activation, stability control system activation and/or regenerative braking activation, for example. Next, as represented by block 78, the operating data is output to the external navigation system. For example, the operating data may be output to an off-board vehicle navigation system 20 or an on-board spatial locating device 22. The operating data may be transmitted by a wired connection, such as a universal serial bus interface or an electrical connector, or a wireless connection, such as a cellular signal, Bluetooth or WiFi, for example. The vehicle position is then determined without external positioning signals, as represented by block 80. In certain embodiments, the vehicle position may be determined via dead reckoning based on vehicle speed and compass heading, for example. Consequently, an accurate vehicle position may be determined, even when the gain of the external positioning signals is insufficient to determine vehicle position.

In addition, road conditions are determined based on the operating data, as represented by block 82. For example, if the external navigation system detects frequent activation of the antilock braking system and/or the stability control system, the external navigation system will identify a slippery road surface (e.g., due to rain, ice, snow, etc.). The external navigation system may then relay the road condition information to other drivers, thereby advising the drivers of the slippery conditions. Furthermore, as represented by block 84, traffic conditions are determined based on the operating data. For example, if the external navigation system detects frequent application of the vehicle brakes and/or low vehicle speed relative to the posted speed limit, the external navigation system will identify a high traffic density and/or a low ambient speed condition. The external navigation system may then relay the traffic condition information to other drivers, thereby advising the drivers of the slow moving/high density traffic.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle communication network, comprising:
an interface module built-in to the vehicle and configured to receive operating data from a vehicle information system, and to selectively output the operating data to an off-board vehicle navigation system for determining vehicle position without using external positioning signals received or processed by the vehicle only while the external positioning signals are not available or are unreliable, wherein the off-board vehicle navigation system is positioned remote from the vehicle and is configured to receive operating data from a plurality of vehicles via respective vehicle communication networks.

2. The vehicle communication network of claim 1, wherein the interface module comprises a first interface configured to communicate with the vehicle information system, and a second interface configured to communicate with the off-board vehicle navigation system.

3. The vehicle communication network of claim 2, wherein the first interface comprises a CAN Bus interface, a FlexRay interface, an Ethernet interface, or a combination thereof.

4. The vehicle communication network of claim 2, wherein the second interface comprises a Bluetooth interface, a WiFi interface, cellular signals, or a combination thereof.

5. The vehicle communication network of claim 1, wherein the interface module is configured to receive signals indicative of route information, destination information, or a combination thereof, from the off-board vehicle navigation system.

6. The vehicle communication network of claim 1, wherein the off-board vehicle navigation system is configured to determine road conditions, traffic conditions, or a combination thereof, based on the operating data.

7. The vehicle communication network of claim 1, comprising an on-board controller configured to determine vehicle position based on the external positioning signals.

8. The vehicle communication network of claim 7, wherein the off-board vehicle navigation system is configured to selectively receive signals indicative of the vehicle position from the on-board controller while the external positioning signals are available.

9. The vehicle communication network of claim 1, wherein the operating data comprises vehicle speed, compass heading, distance traveled, steering angle, yaw rate, acceleration, brake pedal position, antilock braking system activation, stability control system activation, regenerative braking activation, or a combination thereof.

10. The vehicle communication network of claim 1, wherein the vehicle information system comprises a speed sensor, an electronic compass, a transmission sensor, an antilock braking system, a stability control system, an electric motor controller, or a combination thereof.

11. A vehicle communication network, comprising:
a vehicle information system configured to output operating data;
an on-board controller configured to determine a position of a vehicle based on external positioning signals;
an off-board vehicle navigation system configured to selectively receive signals indicative of the vehicle position from the on-board controller while the external positioning signals are available; and
an interface module built-in to the vehicle and configured to receive the operating data from the vehicle information system, and to selectively output the operating data to the off-board vehicle navigation system for determining the vehicle position without using the external positioning signals only while the external positioning signals are not available or are unreliable;
wherein the off-board vehicle navigation system is positioned remote from the vehicle and is configured to receive operating data from a plurality of vehicles via respective vehicle communication networks.

12. The vehicle communication network of claim 11, wherein the operating data comprises vehicle speed, compass heading, distance traveled, steering angle, yaw rate, acceleration, brake pedal position, antilock braking system activation, stability control system activation, regenerative braking activation, or a combination thereof.

13. The vehicle communication network of claim 11, wherein the off-board vehicle navigation system is configured to determine road conditions, traffic conditions, or a combination thereof, based on the operating data.

14. The vehicle communication network of claim 11, wherein the interface module comprises a first interface configured to communicate with the vehicle information system, and a second interface configured to communicate with the off-board vehicle navigation system.

15. The vehicle communication network of claim 14, wherein the second interface comprises a Bluetooth interface, a WiFi interface, cellular signals, or a combination thereof.

16. A vehicle communication network, comprising:
an interface module built-in to the vehicle and configured to receive operating data from a vehicle information system, and to selectively transfer the operating data to an on-board spatial locating device only while external positioning signals are not available or are unreliable, wherein the on-board spatial locating device is not built-in to the vehicle, and the operating data facilitates vehicle position determination without using the external positioning signals; and
an electrical outlet positioned within an interior of the vehicle, wherein the electrical outlet is configured to receive a corresponding electrical connector of the on-board spatial locating device and to supply electrical power to the on-board spatial locating device via a direct current power signal, and the interface module is configured to transfer the operating data to the on-board spatial locating device by modulating the direct current power signal.

17. The vehicle communication network of claim 16, wherein the interface module comprises a first interface configured to communicate with the vehicle information system, and a second interface configured to communicate with the on-board spatial locating device.

18. The vehicle communication network of claim 17, wherein the first interface comprises a CAN Bus interface, a FlexRay interface, an Ethernet interface, or a combination thereof.

19. The vehicle communication network of claim 16, wherein the operating data comprises vehicle speed, compass heading, distance traveled, steering angle, yaw rate, acceleration, brake pedal position, antilock braking system activation, stability control system activation, regenerative braking activation, or a combination thereof.

20. The vehicle communication network of claim 16, wherein the electrical outlet comprises a cigarette lighter receptacle.

* * * * *